(12) United States Patent
Anerousis et al.

(10) Patent No.: US 10,708,120 B2
(45) Date of Patent: *Jul. 7, 2020

(54) RECOMMENDING SERVER MANAGEMENT ACTIONS FOR INFORMATION PROCESSING SYSTEMS

(71) Applicant: International Business Machines Corporation, Armonk, NY (US)

(72) Inventors: Nikolaos Anerousis, Chappaqua, NY (US); Anuradha Bhamidipaty, Bangalore (IN); Shang Q. Guo, Cortlandt Manor, NY (US); Suman K. Pathapati, Bangalore (IN); Daniela Rosu, Ossining, NY (US); Mitesh H. Vasa, Bangalore (IN); Anubha Verma, Bangalore (IN); Frederick Wu, Cos Cob, CT (US); Sai Zeng, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/456,784

(22) Filed: Mar. 13, 2017

(65) Prior Publication Data

US 2018/0062912 A1    Mar. 1, 2018

Related U.S. Application Data

(63) Continuation of application No. 13/780,272, filed on Feb. 28, 2013, now Pat. No. 9,667,473.

(51) Int. Cl.
*G06F 15/173* (2006.01)
*H04L 12/24* (2006.01)

(52) U.S. Cl.
CPC ........ *H04L 41/065* (2013.01); *H04L 41/0654* (2013.01); *H04L 41/0686* (2013.01)

(58) Field of Classification Search
CPC ............. G06F 11/0787; G06F 11/0793; H04L 41/0246; H04L 41/065; H04L 41/0654; H04L 41/0686

(Continued)

(56) References Cited

U.S. PATENT DOCUMENTS 5,539,877 A     7/1996 Winokur et al.
6,957,257 B1 * 10/2005 Buffalo ............... G06F 11/0748
                                                                709/200

(Continued)

OTHER PUBLICATIONS

Song, Y., et al., "Problem Classification Method to Enhance the ITIL Incident, Problem and Change Management Process," WWW2008, Apr. 21-25, 2008, Beijing, China. Copyright is held by author/owners.

(Continued)

*Primary Examiner* — Kaylee J Huang
(74) *Attorney, Agent, or Firm* — Fleit Intellectual Property Law; Thomas S. Grzesik

(57) ABSTRACT

One or more embodiments identify server management actions for resolving problems associated with one or more nodes in information technology infrastructure. In one embodiment, a node-ticket record for an information processing node associated with at least one problem ticket is generated. A set of node-ticket clusters is queried based on the node-ticket record. Each of the set of node-ticket clusters maps a set of server management actions to set of historical node-ticket records associated with the node-ticket cluster. The set of server management actions was previously performed to resolve at least one operational problem associated with at least one information processing node. At least one set of server management actions associated with at (Continued)

least one of the set of node-ticket clusters corresponding to the node-ticket record within a given threshold is identified based on the querying.

19 Claims, 12 Drawing Sheets

(58) Field of Classification Search
USPC .................................. 709/223, 224, 204, 206
See application file for complete search history.

(56) References Cited

U.S. PATENT DOCUMENTS

| | | | |
|---|---|---|---|
| 7,051,243 B2 | 5/2006 | Helgren et al. | |
| 7,068,309 B2 | 6/2006 | Toyama et al. | |
| 7,200,592 B2 | 4/2007 | Goodwin et al. | |
| 7,603,419 B2 | 10/2009 | Gardner et al. | |
| 7,979,747 B2 | 7/2011 | Bhatnagar et al. | |
| 8,028,197 B1* | 9/2011 | Barua | G06Q 10/06 714/26 |
| 2003/0172133 A1* | 9/2003 | Smith | G06Q 30/02 709/219 |
| 2004/0128583 A1 | 7/2004 | Iulo et al. | |
| 2006/0114493 A1 | 6/2006 | Slightam et al. | |
| 2008/0126283 A1 | 5/2008 | Odom et al. | |
| 2009/0063387 A1* | 3/2009 | Beaty | G06N 5/04 706/50 |
| 2009/0319452 A1 | 12/2009 | Gardner et al. | |
| 2010/0082620 A1* | 4/2010 | Jennings | G06F 17/30598 707/736 |
| 2010/0318846 A1* | 12/2010 | Sailer | G06F 11/0748 714/26 |
| 2011/0173623 A1 | 7/2011 | Fujisawa | |
| 2011/0202484 A1* | 8/2011 | Anerousis | G06N 7/005 706/12 |
| 2012/0066547 A1 | 3/2012 | Gilbert et al. | |
| 2013/0117267 A1 | 5/2013 | Buryak et al. | |
| 2013/0262082 A1* | 10/2013 | McKeeman | G06F 17/27 704/9 |

OTHER PUBLICATIONS

Lenchner, J. et al., "A Service Delivery Platform for Server Management Services," IBM J. Res. & Dev. vol. 53, No. 6, paper 2, 2009, 0018-8646/09 copyright 2009 IBM.

Non-Final Rejection dated Jan. 15, 2015, received for U.S. Appl. No. 13/780,272.

Final Rejection dated Jul. 16, 2015, received for U.S. Appl. No. 13/780,272.

Non-Final Rejection dated Jul. 18, 2016, received for U.S. Appl. No. 13/780,272.

* cited by examiner

| PROBLEM TICKET ID | PROBLEM DESCRIPTION | ACTIONS | ... |
|---|---|---|---|
| P1 | CAPACITY/PHYSICAL DISK SPACE | CLEAR EVENT LOGS | ... |
| ... | ... | ... | ... |

FIG. 2

| SYSTEM ID | SYSTEM DESCRIPTION | ... |
|---|---|---|
| S1 | IBM BLADECENTER H21, PROCESSOR TYPE A @ 2500 MHZ, 8GB MEMORY, OS A 2003 | ... |
| ... | ... | ... |

| SYSTEM ID 404 | TOOLS 406 | TOOL CONFIG. 408 | SCOPE 410 | ... 423 |
|---|---|---|---|---|
| S1 | ITEM V6 | OS | MONITORING | ... |
| S1 | ITCAM DB2 V1.2 | DB XXYY22 | MONITORING | ... |
| S1 | PARITY V2 | TMP-CLEANUP | AUTOMATION | ... |
| S2 | TEM V5 | C:\TEM.MYCONFIG.CMD | AUTOMATION | ... |
| S2 | DB2CMD | - | DB2 COMMAND | ... |
| ... | | | | ... |

| SOLUTION ID | TYPE | SYSTEM DESCRIPTOR | SERVICE MANAGEMENT TOOLS | TOOL CONFIG. | ACTIONS | PROCESS ON TICKET | PROCESS OTHER 518 |
|---|---|---|---|---|---|---|---|
| S1 504 | FULL 506 | OS A 508 | TEM V5, ITEM V6 510 | ITM POLICY, TEM CONFIG FILE, TEM FIXLET 512 | CLEAR EVENT LOG 514 | NONE – NO TICKET EXPECTED 516 | WEEKLY ITM/TEM REPORT |
| S2 | PARTIAL | OS A 2003 | TEM | TEM CONFIG FILE, TEM FIXLET | CLEAR EVENT LOG | LOG TO TEM CONSOLE, EXECUTE FIXLET X | NONE |
| S3 | PARTIAL | OS A | DB2CMD | PATH SETUP | LOG EXTENSION | LOG TO SERVER; EXECUTE SCRIPT Y | NONE |
| ... | | | | | | | ... |

502 519

| PROBLEM TICKET ID | PROBLEM DESCRIPTION | SYSTEM ID | SYSTEM DESCRIPTION | ACTIONS |
|---|---|---|---|---|
| P1 | CAPACITY/PHYSICAL DISK SPACE | S1 | HARDWARE: IBM BLADECENTER H21, ARCHITECTURE: PROCESSOR TYPE A @ 2500 MHZ, 8GB MEMORY, OS: OS A 2003 | CLEAR EVENT LOGS |
| ... | ... | ... | ... | ... |

FIG. 6

RECOMMENDING SERVER MANAGEMENT ACTIONS FOR INFORMATION PROCESSING SYSTEMS

BACKGROUND

The present invention generally relates to problem resolution for information processing systems, and more particularly relates to recommending automation server management actions for information processing systems.

Modern information technology (IT) infrastructures are large, complex, heterogeneous multi-tiered environments. Deploying an automation solution in such a setting is a daunting task because one has to successfully deal with heterogeneity of systems and the resulting idiosyncrasies of their permutations. A vast amount of human effort has to be expended to make the transition to deploying an automation solution in this complex environment by painstakingly analyzing, observing, and automating viable processes within the infrastructure. A large amount of similarity exists in the server management actions of an automation solution on nodes. This is mostly due to the dimensions of heterogeneity being finite, and an automated server management action that is valid for one node could be valid for another node in the infrastructure as well.

BRIEF SUMMARY

In one embodiment a method for identifying server management actions for resolving problems associated with one or more nodes in information technology infrastructure is disclosed. The method comprises generating a node-ticket record for an information processing node associated with at least one problem ticket. The node-ticket record comprises a set of system descriptors and a set of problem descriptors. Each of the set of system descriptors describes at least one attribute of the information processing node. Each of the set of problem descriptors describes at least one operational problem occurring at the information processing node. A set of node-ticket clusters is queried based on the node-ticket record. Each of the set of node-ticket clusters maps a set of server management actions to set of historical node-ticket records associated with the node-ticket cluster. Each of the set of historical node-ticket records comprises at least one common system descriptor and at least one common problem descriptor. The set of server management actions was previously performed to resolve at least one operational problem associated with at least one information processing node. At least one set of server management actions associated with at least one of the set of node-ticket clusters corresponding to the node-ticket record within a given threshold is identified based on the querying, at least.

In another embodiment a method for identifying automation solutions for automatically resolving problems associated with one or more nodes in information technology infrastructure is disclosed. The method comprises generating a node-ticket record for an information processing node associated with a problem ticket. The node-ticket record comprises a set of problem descriptors and at least one of a set of system descriptors and a set of service management descriptors. Each of the set of problem descriptors describes at least one operational problem occurring at the information processing node. Each of the set of system descriptors describes at least one attribute of the information processing node. Each set of service management descriptors describe at least one attribute of at least one set service management tools and processes associated with the information processing node. A set of node-ticket clusters is queried based on the node-ticket record. Each of the set of node-ticket clusters maps a set of server management actions to a set of historical node-ticket records associated with the node-ticket cluster. Each of the set of historical node-ticket records comprises at least one common system descriptor and at least one of one or more common problem descriptors and one or more common service management descriptors. Each of the set of node-ticket clusters maps to none, one, or more automation solution descriptors. Each automation solution descriptors comprises descriptors of system descriptors, prerequisite service management tools, setup instructions, implemented service management actions, and service management processes. The set of server management actions was previously used to resolve at least one operational problem associated with at least one information processing node. The set of automation solutions server management solutions was defined by experts or previously used to implement at least one of the service management actions associated with at least one information processing node. The query returns at least one set of server management actions associated with at least one of the set of node-ticket clusters corresponding to the node-ticket record within a given threshold. The query also return at least one automation solution that implements the at least one set of server management actions. Each item returned by the query is associated with a confidence level. In one embodiment, only items within a given confidence threshold are returned, but this is not required.

In yet another embodiment, a computer program product for identifying server management actions for resolving problems associated with one or more nodes in information technology infrastructure is disclosed. The computer program product comprises a storage medium readable by a processing circuit and storing instructions for execution by the processing circuit for performing a method. The method comprises generating a node-ticket record for an information processing node associated with at least one problem ticket. The node-ticket record comprises a set of system descriptors and a set of problem descriptors. Each of the set of system descriptors describes at least one attribute of the information processing node. Each of the set of problem descriptors describes at least one operational problem occurring at the information processing node. A set of node-ticket clusters is queried based on the node-ticket record. Each of the set of node-ticket clusters maps a set of server management actions to set of historical node-ticket records associated with the node-ticket cluster. Each of the set of historical node-ticket records comprises at least one common system descriptor and at least one common problem descriptor. The set of server management actions was previously performed to resolve at least one operational problem associated with at least one information processing node. At least one set of server management actions associated with at least one of the set of node-ticket clusters corresponding to the node-ticket record within a given threshold is identified based on the querying, at least.

In a further embodiment, an information processing system for identifying server management actions for resolving problems associated with one or more nodes in information technology infrastructure is disclosed. The information processing system comprises a memory and a processor communicatively coupled to the memory. An action recommendation module is communicatively coupled to the memory and the processor. The action recommendation module is configured to perform a method. The method comprises generating a node-ticket record for an information processing node associated with at least one problem ticket. The node-ticket record comprises a set of system descriptors and a set of problem descriptors. Each of the set of system descriptors describes at least one attribute of the information processing node. Each of the set of problem descriptors describes at least one operational problem occurring at the information processing node. A set of node-ticket clusters is queried based on the node-ticket record. Each of the set of node-ticket clusters maps a set of server management actions to set of historical node-ticket records associated with the node-ticket cluster. Each of the set of historical node-ticket records comprises at least one common system descriptor and at least one common problem descriptor. The set of server management actions was previously performed to resolve at least one operational problem associated with at least one information processing node. At least one set of server management actions associated with at least one of the set of node-ticket clusters corresponding to the node-ticket record within a given threshold is identified based on the querying, at least.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 shows one example of ticket data associated with a problem ticket according to one embodiment of the present invention;

FIG. 3 shows one example of system descriptor information associated with an information processing node according to one example of the present invention;

FIG. 4 shows one example of service management descriptor information according to one example of the present invention;

FIG. 5 shows one example of automation solution descriptor information according to one example of the present invention;

FIG. 6 shows one example of a node-ticket record according to one embodiment of the present invention;

DETAILED DESCRIPTION

Operating Environment

Figure 1:
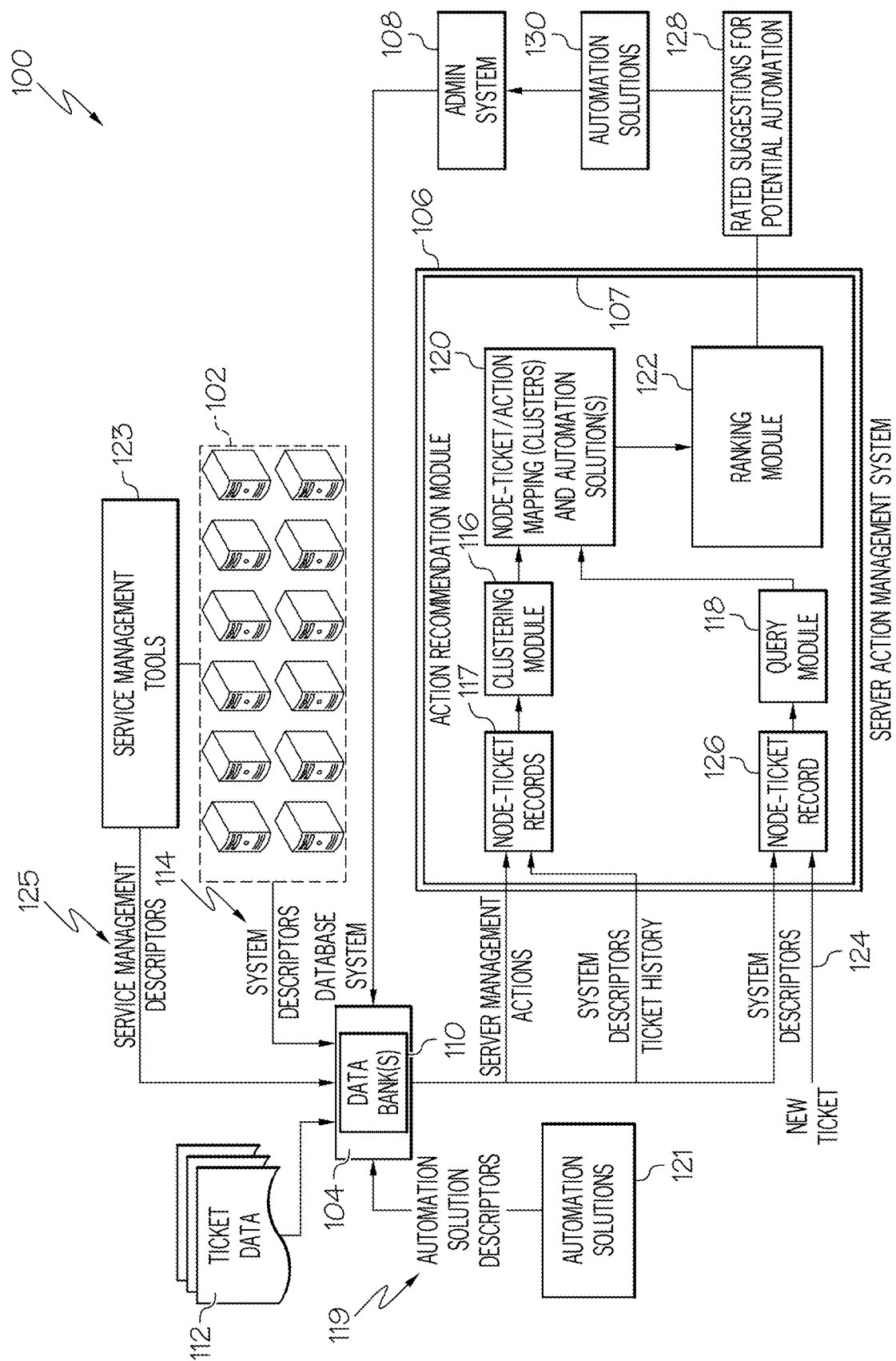
FIG. 1 is a block diagram illustrating one example of an operating environment according to one embodiment of the present invention.

FIG. 1 shows one example of an operating environment 100 applicable to various embodiments of the present invention. In particular, the environment 100 of FIG. 1 comprises an infrastructure of nodes (information processing systems) 102, one or more database systems 104, one or more server action management systems 106, and one or more administrator systems 108. In one embodiment, each of these information processing systems 102, 104, 106, 108 is communicatively coupled to one another via one or more networks (not shown).

The database system 104, in one embodiment, comprises one or more databases (databanks) 110 of problem resolution. The database(s) 110 stores/maintains associations of computer systems with problem tickets and server management information such as diagnoses, remedial actions, and automated solutions. In one embodiment, the remedial actions were selected and taken by domain experts (and/or an automated system) to resolve the problems identified in the problem tickets. A problem ticket, in one embodiment, is a record of a problem with one or more of the nodes 102. A problem ticket can be created manually by help desk staff in response to a user phone call or other communication, or can be generated automatically by a system monitoring application.

After creation, a problem ticket is typically routed by a dispatcher to a system administrator system 108 associated with a system administrator (SA) with the appropriate skills to diagnose and resolve the problem. When the system administrator has resolved the problem, (s)he may record information within the database system 104 about the diagnosis, remedial actions, and any relevant automated solutions. Experts or a governance body create automation solution descriptors 119 for automation solutions 121 implementing one or more of the actions recorded by SAs. In one embodiment, an automation solution 121 is either a descriptor(s) of possible server management actions; a descriptor(s) of possible automation solutions; and/or a record(s) of actual automation solutions.

An automation solution descriptor 119 comprises service management tool information, system descriptor information, tool setup information, actions performed, process information, etc. Service/System management tools 123 are used to manage the information processing systems 102. In one embodiment, service management descriptors 125 are generated that describe the various service/system management tools associated with a given information processing system.

Therefore, in one embodiment, the database(s) 110 within the database system 104 stores/maintains ticket data 112 associated with problem tickets; system descriptor information 114 associated with the infrastructure systems 102; action information 115 associated with actions performed by a user (e.g., administrator) or an automated system to resolve the problem identified in the problem ticket; automation descriptors 121 or any information associated with an automation solution 121 for automatically correcting problems associated with information processing systems 102; and service management descriptors 125 associated with the infrastructure systems 102. Diagnosis information identifying the cause of a problem associated with a node 102 can also be stored within the database 110 as well.

The server action management system 106, in one embodiment, comprises an action recommendation module 107. It should be noted that the action recommendation module 107 (or at least one or more of its components) can also reside within the administrator system 108 (or any other system) as well. The action recommendation module 107 comprises a clustering module 116, a query module 118, a node-ticket/action mapping 120 (also referred to herein as a "set of node-ticket clusters 120" or "action clusters 120"), and a ranking module 122. As will be discussed in greater detail below, the server action management system 106 utilizes these components to correlate the server management actions, descriptors, and ticket data stored in the database system 104 into a cluster space. A mapping between descriptors, ticket data, and server management actions is then learned by the server action management system 106 from this cluster space. When a new node or a set of nodes is added to the infrastructure, for which a problem resolution has not been previously performed, the descriptors and ticket data of that node are projected onto the cluster space and the most relevant server management actions are suggested to a user (and/or automated system) along with their level of specificity. In another embodiment, relevant automation solutions 130 are also suggested to a user.

For example, when the server action management system 106 receives a new problem/trouble ticket 124 associated with one or more information systems 102, the server action management system 106 utilizes these components to exploit the data (e.g., various descriptor information, ticket data, and system management tools/solutions) that already exists in database system(s) 104 to recommend diagnoses, remedial actions, and/or automation solutions to solve the problem identified in the problem ticket 124. If an automation solution is already deployed for the related problem ticket, the server action management system 106 informs the SA about the solution process to execute on new ticket, and other solution details FIG. 2 shows one example of ticket data 212 from a problem ticket that is maintained within a database 110 of the database system 104. In one embodiment, ticket data is manually stored within the database system 104 by a user and/or is extracted from a problem ticket by the server action management system 106 discussed below. In particular, FIG. 2 shows that the ticket data 212 comprises a problem ticket identifier 202 that uniquely identifies the problem ticket associated with the ticket data 112. The ticket data 212 also comprises problem ticket descriptor information 204 and action information 206.

The problem ticket descriptor information 204 comprises problem ticket descriptors for an issue (operational problem) caused by an errant operational condition(s) of the associated node 102. In one embodiment, the problem ticket descriptors are multi-tiered descriptors such as problem description, problem type, duration, etc. For example, higher level descriptors can include (but are not limited to) "capacity", "hardware", "application", "user admin", etc. that describe the problem with the associated information processing system. Lower level, or finer grain descriptors can include (but are not limited to) "failure cause" with values such as "logical disk space", "memory utilization", or "paging utilization".

It should be noted that ticket data/descriptors 112 associated with one problem ticket can have a different level of specificity than ticket data/descriptors 112 associated with another problem ticket. For example, the ticket data 112 of one problem ticket can comprise a first descriptor that identifies the problem as a "Capacity/Physical Disk Space" problem. However, the ticket data 112 of another problem ticket can comprise a second descriptor that identifies the problem as a "Capacity/Physical Disk Space/DB2" problem. As can be seen, the second descriptor comprises "DB2" in addition to Capacity/Physical Disk Space, whereas the first descriptor only comprises "Capacity/Physical Disk". Therefore, the second descriptor has greater specificity, or is more specific (i.e., provides more details) with respect to the problem associated with a node.

The ticket data 112 can further include diagnosis information such as "file system usage percentage threshold exceeded". This diagnosis information identifies the cause of the problem or the problem itself associated with a node 102. The action information 206 includes information that identifies and/or describes the actions taken by a user and/or an automated system to resolve the problem associated with the corresponding node 102. Actions can include (but are not limited to) "delete /tmp files", "delete log files" "extend file system", etc. For example, the ticket data 212 of FIG. 2 shows that the action(s) taken to resolve the "Capacity/Physical Disk Space" problem was to clear the event logs.

It should be noted than a node 102 can be associated with multiple problem tickets and, hence, multiple ticket data entries 112 within the database 110. Also, similar nodes can share an association with the same actions for similar problems. Therefore, as will be discussed in greater detail below, a domain expert (or automated system) can position each node 102 and problem ticket into a taxonomy that categorizes nodes and tickets at various levels of specialization/generalization. Here, a taxonomy is a hierarchical classification mechanism that has supertype-subtype relationships, also referred to as generalization-specialization relationships. Therefore, each problem ticket descriptor 204 and system descriptor 304 can have various degrees of specificity.

FIG. 3 shows one example of system descriptor information 314 that can be recorded in a database(s) 110 of the database system 104. It should be noted that this database(s) 110 can be the same or different from the database(s) 110 that stores the ticket data 112. In one embodiment, the system descriptor information is manually stored within the database system 104 by a user and/or is extracted from a problem ticket by the server action management system 106 discussed below. In particular, FIG. 3 shows that the system descriptor information 314 comprises a system identifier 302 that uniquely identifies the system associated with the system descriptor information 314. The system descriptor information 314 also comprises system descriptors 304.

In one embodiment, the system descriptors 304 are multi-tiered descriptors including (but not limited to) "system architecture", "operating system class", "operating system", "application", etc. that describe various characteristics, attributes, and/or capabilities or the system. Each of these descriptors can have various granularities to provide additional details associated with the system. For example, the system architecture can identify the processor type, speed, manufacturer, etc.

The system descriptors 304 of FIG. 3 show that the architecture is an IBM BladeCenter H21 with Processor Type A running at 2500 MHz. The system has 8 GB of memory, and is running operating system "OS A" version 2003. It should be noted that the system descriptors of one node can have a different specificity than the system descriptors of another node. For example, a first system descriptor of one node may include Architecture A and OS Class B, while a second system descriptor of another node may include Architecture A, OS Class B, OS Version C, and Processor D. As can be seen, the second system descriptor is more specific (i.e., provides more details) than the first system descriptor.

The system descriptor information 114 can also include dynamic system descriptors that provide dynamic information associated with the corresponding node 102. One example of a dynamic system descriptor is "percent of /tmp file system utilized" with value of "90%". Dynamic system descriptors, in one embodiment, reflect the state of the node just prior to (within a given amount of time) the anticipated server management action. In another embodiment, dynamic system descriptors include information reflecting the state of the node at multiple times between ticket creation and the anticipated server management action.

FIG. 4 shows one example of service management descriptor information 423. A node can be managed using one or more system management tools such as tools for monitoring, automation, user access management, etc. A given service management descriptor 402 identifies the system ID 404 of a system associated with the service management descriptor 402, the tool(s) 406 used to manage the system, tool configuration details 408, and the scope of management 410. For example, a first system descriptor 404 indicates that system S1 is managed by tool ITEMv6, which is configured to monitor the operation system (OS). FIG. 4 also shows that system S1 is also managed by PARITY to execute cleanup of /tmp.

FIG. 5 shows one example of automation solution descriptor information 519. In one embodiment, a given automation solution descriptor 502 comprises a solution ID 504 that uniquely identifies an automation solution. The descriptor 502 also comprises details about the type of automation 506; a system descriptor 508 (discussed above with respect to FIG. 3); service management tools 510 required to implement the automation; setup actions for these service management tools 512; actions performed on the end system 514; process (actions) 516 for handling future incidents; process (actions) 518 for related activities such as reporting; and/or the like.

The automation type 506 indicates whether the solution is full automation or partial automation. A solution is full-automation when the incidents are not expected to occur again, or if they occur the incidents are to be handled completely by the service management tools. For example, a "log space full" event is detected by the monitoring system (ITEMv6), which triggers the automated execution of an automation tool (TEM) to clear up space. A solution is partial-automation when the system administrator has to manually invoke one or more commands that will fix the problem (incident), and possibly review intermediary results.

The service management tools 510 required for the solution provide a complete description of the tool(s) and its version that should be available for the solution actions to be executed. The tool configuration 512 information and setup action information 514 identify the details such as the monitoring policy to be defined for monitoring tools; configuration files or changes to existing configuration files for automation tools; automation artifacts (e.g., TEM fixlets) to be invoked by the system administrator; agent initialization commands; user ID changes on the target or management nodes; etc.

Process action information 516, 518 include a description of the process/actions to be executed when new related ticket occurs and, possibly, other processes to be established related to the solution. Sample actions to be executed when ticket occurs include tool and commands to be used, and parameter specification as derived from ticket description. Other processes that can be established related to the solution, especially for full-automation solutions, may include a periodic health check or periodic reporting actions that help the system administrator ensure that the solution is producing the expected results.

It should be noted that when the ticket data 112, system descriptor information 114, action information 115, service management descriptor information 423, and automation solution descriptor information 519 are stored within the database system 104 they can be stored separate from each other or stored together. In the embodiment where the ticket data 112 (including the action information 115) and descriptor information 114, 423, 519 are stored separate from each other, a pointing mechanism is utilized to map the ticket data 112 and system descriptor information 114 for a given information processing system(s) 102 to each other. In the embodiment where the ticket data 112 (including the ticket information 115) and descriptor information 114, 423, 519 are stored together, a single table can comprise multiple records, where each record comprises the information shown in FIGS. 2 to 5.

Recommending Server Actions

As discussed above, when a new problem ticket 124 is received the server action management system 106 searches the database system 104 for previous tickets that are similar to the new problem ticket 124 and that were also generated for nodes that are similar to the node associated with the new problem ticket 124. In one embodiment, similarity is determined based on the attributes of the problem tickets and/or attributes of the system descriptor information. The server action management system 106 determines the diagnosis and remedial actions that were taken for such similar tickets from the ticketing data 112 stored within the database system 104. The server action management system 104 uses these identified actions to recommend the diagnosis and corrective actions for the new ticket 124.

In one embodiment, the action recommendation module 107 of the server action management system 106 performs a multi-stage process for recommending server management actions. The first stage is a learning stage during which the action recommendation module 107 performs one or more learning operations on the ticket data 112 and the system descriptor information 114 stored within one or more databases 110 of the database system 104. During this learning stage the action recommendation module 107 generates a node-ticket/action record 117. For example, N is the set of all nodes 102 in an organization's IT infrastructure comprising of nodes $\{n_1, n_2 \ldots n_m\}$. T is the set of all available problem tickets $\{t_1, t_2 \ldots t_o\}$ whose data is stored within the database system 104. Further, $N_a$ is a subset of N comprising nodes for which a wealth of problem ticket and remedial action history exists. For each node $n_v$ in $N_a$ its system descriptors (from the system descriptor information 114) $\{d_{s1}, d_{s2} \ldots d_{sq}\}$ and its ticket descriptors (from the ticket data 112) $\{d_{t1}, d_{t2} \ldots d_{tr}\}$ are combined to form a node-ticket record $ND_v \{d_{n1}, d_{n2} \ldots d_{nq+r}\}$.

For example, the action recommendation module 107, for each problem ticket associated with information stored within the database system 104, identifies the attributes/characteristics of the corresponding node 102 from the system descriptor information 114 also stored in the database system 104. Examples of the attributes/characteristics identified by the action recommendation module 107 are hardware type, processor information, memory information, BIOS information, operating system platform/version, installed applications/versions, etc. The action recommendation module 107 also identifies the problem that was associated with the corresponding node 102 from the ticket data 112. Examples of the problem information obtained by the action recommendation module 107 are failure class, problem, cause, etc. Based on the obtained ticket and system descriptor information the action recommendation module 107 constructs a node-ticket record 117 for the given problem ticket/node. A node-ticket record space is also constructed from all of the node-ticket records with one dimension being attributed for each node and ticket feature. Stated differently, each node-ticket record is represented by a point in the joined space of system and ticket descriptors. The node-ticket records 117, in one embodiment, are stored within the database system 104.

FIG. 6 shows one example of a node-ticket record 600 generated by the action recommendation module 107. In this example, the node-ticket record 600 comprises the problem ticket ID 602 (optional) associated with the node, problem ticket descriptors 604, the system ID 606 (optional) associated with the node, system descriptors 608, and remedial actions 610 that were taken to solve the problem associated with the node. It should be noted that any diagnosis information and/or or dynamic system descriptors associated with the node can also be included within the node-ticket record 600. As discussed above, the information included within the node-ticket record 600 is obtained by the action recommendation module 107 from the database system 104.

The node-ticket records 117 are provided to the clustering module 116. The clustering module 116 performs one or more clustering operations on the node-ticket records to generate a node-ticket/action descriptor mapping M 120, also referred to herein as a "set of node-ticket clusters 120". Each node-ticket cluster represents a set of similar problem tickets that were generated for similar nodes 102. Depending on the clustering operations and parameters used a cluster may be a single point or a region (e.g., Process type A between 2500 and 3200 MHZ). In one embodiment, the clustering module 107 creates clusters by identifying node-ticket keywords which are similar (i.e., words with high correlation) and that have similar actions. All such node-ticket records and corresponding action mappings that have high correlation (e.g., within a given threshold) are clustered together and assigned a label. It should be noted that this is only one example of how clusters can be generated, and any type of clustering operating can be performed to create the clusters.

As part of generating clusters, the action recommendation module 107 maps a set of actions to each cluster. For example, S is the set of all server management actions $\{s_1, s_2, \ldots, s_t\}$ stored within the database system 104. For each server management action $s_x$ that was executed on each node $n_y$, the action recommendation module 107 identifies the node-ticket records 117 associated with the action $s_x$ and that have similar problem/system descriptors (as discussed above). The action recommendation module 107 then clusters these node-ticket records 117 into the same cluster. Stated differently, the node-ticket records 117 within a given cluster are associated with similar (e.g., within a given threshold) problem/system descriptors and server management actions that were performed to solve a similar problem.

Therefore, a cluster provides a node/ticket/action mapping M. This mapping M maps server management actions to system descriptors for a given problem descriptor(s). The mapping M identifies given node/system features that lead to given remedial actions, and associates each of the remedial actions to the system descriptors of the nodes in a cluster for which the actions were taken. In one embodiment, each cluster, and as a result, each $s_x$ in S associated with the cluster has an associated taxonomic label $o_p$ that describes where the node-ticket/action mapping is in the taxonomy O. The taxonomic label $o_p$ represents the specificity of a node-ticket/action in the taxonomy. The taxonomic label $o_p$ can be viewed as a categorization label of the cluster and, in one embodiment, it is the cluster label that is determined by unsupervised clustering algorithms.

Figure 7:
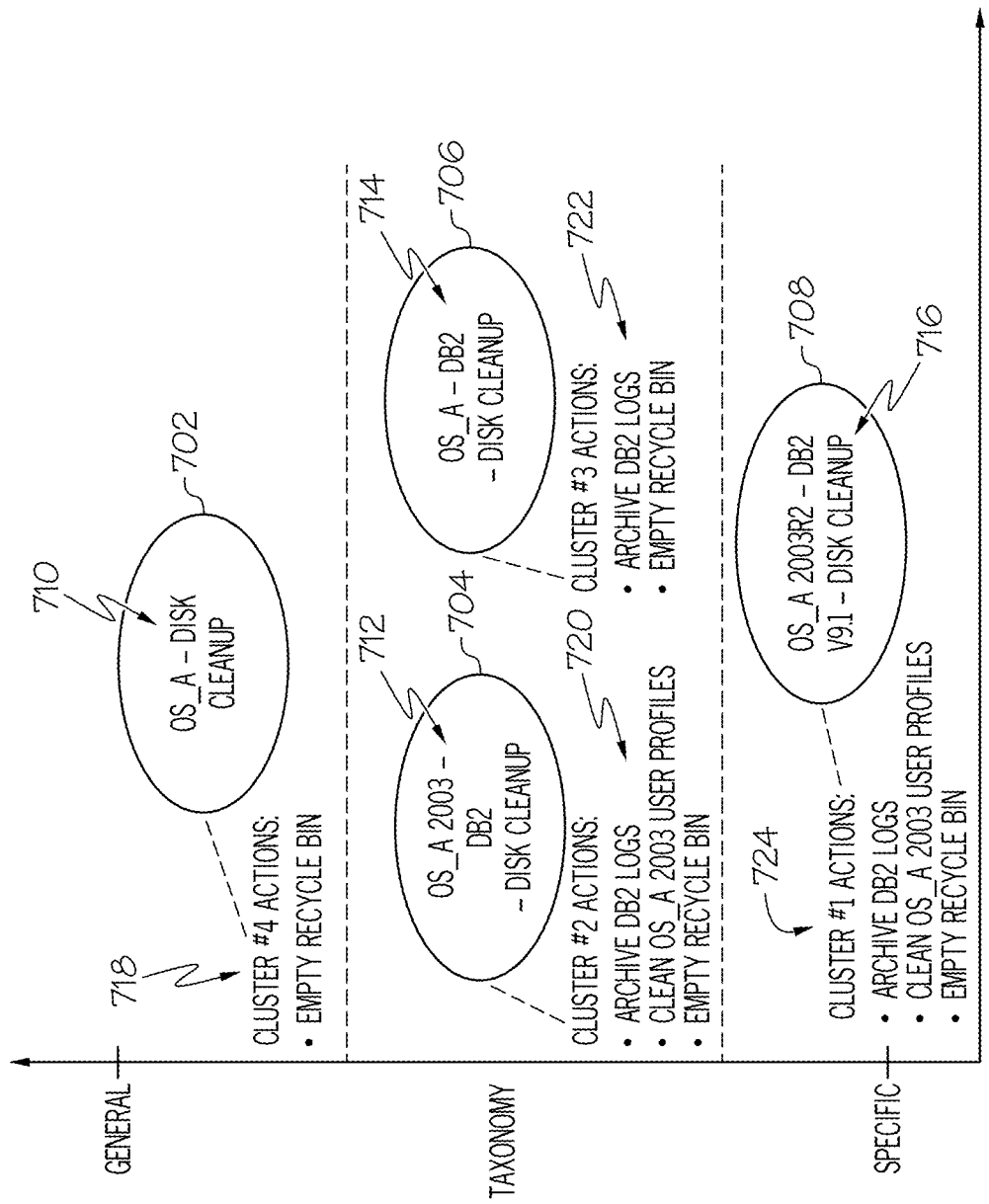
FIG. 7 shows one example of node-ticket (action) clusters according to one embodiment of the present invention.

FIG. 7 shows one example of node-ticket clusters (also referred to herein as "action clusters") generated by the clustering module 106. In particular, the example of FIG. 7 shows a plurality of clusters along with their given taxonomy labels $o_p$. In FIG. 7, four clusters 702, 704, 706, 708 are shown. The ovals represent the clusters 702, 704, 706, 708 and the text within the ovals is the taxonomic label $o_p$ 710, 712, 714, 716 associated with the clusters. The first cluster 702 is comprised of node-ticket records associated with a disk cleanup problem ticket. Each node-ticket record in this first cluster 702 has an OS system descriptor of: OS A. Therefore, the taxonomic label assigned to this cluster 702 by the clustering module 116 is "OS A—Disk Cleanup", where "OS A" is the common system descriptor(s) of the node-tickets descriptors associated with the first cluster 702, and "disk cleanup" identifies the common problem associated with the node-ticket records in the first cluster 702. In other words, each node-ticket record associated with the first cluster 702 comprises a problem ticket descriptor of "Disk Cleanup" and a system descriptor of "OS A". In addition, each node-ticket record associated with the first cluster 702 is also associated with an action 718 of "Empty Recycle Bin" that was taken to resolve the "Disk Cleanup" problem.

The second cluster 704 has a taxonomy label 712 of "OS A 2003—DB2—Disk Cleanup" and is associated with the actions of "Archive DB2 logs", "Clean OS A 2003 user profiles", and "Empty Recycle Bin". Therefore, the node-ticket records within the second cluster 704 each comprise a problem descriptor of "Disk Cleanup", and have system descriptors of "OS A 2003" and "DB2". Also, each node-ticket record within the second cluster 704 is associated with the actions 720 of "Archive DB2 logs", "Clean OS A 2003 user profiles", and "Empty Recycle Bin" that were taken to resolve the "Disk Cleanup" problem.

The third cluster 706 has a taxonomy label 714 of "OS A—DB2—Disk Cleanup" and is associated with the actions of "Archive DB2 logs", and "Empty Recycle Bin". Therefore, the node-ticket records within the third cluster 706 each comprise a problem descriptor of "Disk Cleanup" and have system descriptors of "OS A" and "DB2". Also, each node-ticket record within the third cluster 706 is associated with the actions 722 of "Archive DB2 logs" and "Empty Recycle Bin" that were taken to resolve the "Disk Cleanup" problem.

The fourth cluster 708 has a taxonomy label 716 of "OS A 2003 Version 2—DB2 V9.1—Disk Cleanup" and is associated with the actions of "Archive DB2 logs", "Clean OS A 2003 User Profiles", and "Empty Recycle Bin". Therefore, the node-ticket records within the fourth cluster 708 each comprise a problem descriptor of "Disk Cleanup" and have system descriptors of "OS A 2003 Version 2" and "DB2 V9.1". Also, each node-ticket record within the fourth cluster 708 is associated with the actions 724 of "Archive DB2 logs", "Clean OS A 2003 User Profiles", and "Empty Recycle Bin" that were taken to resolve the "Disk Cleanup" problem.

As can be seen from the example shown in FIG. 7, the clusters 702, 704, 706, 708 have varying degrees of specificity in their taxonomy. In particular, the first cluster 702 has the most general taxonomy since it only identifies the OS type (e.g., OS A), whereas the fourth cluster 708 has the most specific taxonomy since it identifies the OS type (e.g., OS A), the OS version (2003R2), an application (e.g., DB2), and the version of the application (e.g., V9.1). It should be noted that specificity can be viewed as the distance from the root node of the taxonomic classification. In other words, the root node in the given example can be a generic cluster labeled as "disk cleanup", which encompasses all the clusters shown in FIG. 7. However, in other embodiments, a more refined set of smaller clusters can be formed.

It should be noted that, in one embodiment, the clustering operations discussed above are performed offline. For example, the clustering operations are performed when certain criteria are met. An example of these criteria could be when the number of historical node-ticket-action records stored in the database exceeds a predetermined threshold, such that the density of data points for clustering is sufficiently high. Another example of a criterion could be the passage of time, so that clusters are periodically updated with new information. However, in other embodiments, one or more clustering operations are performed in real-time.

In one embodiment, the clustering module 116 also computes the distribution of diagnoses and actions taken for each node-ticket 117 within a cluster. For example, in FIG. 7, the second cluster 704 is associated with a number of disk cleanup problem tickets for which several different diagnoses were made and several different actions were taken. These actions included "Archive db2 logs", "Clean win 2003 user profiles", and "Empty Recycle bin". However, suppose that for 60% of these tickets the diagnosis was "full db2 logs" and the action taken was "Archive db2 logs"; for 20% of these tickets the diagnosis was "excess user profiles" and the action was "Clean win 2003 user profiles"; and for 80% of these tickets the diagnosis was "full recycle bin" and the action was "Empty Recycle bin". Based on the above, the clustering module 116 computes this distribution, and ranks the diagnoses/actions based on their percentage frequency. This ranking and optionally the numeric percentage frequency is shown to the system administrator as guidance for choosing the appropriate diagnoses and actions to be taken when faced with a new problem ticket that has been associated with this cluster.

A second stage of the multi-stage process performed by the action recommendation module 107 is a production stage. During this stage, the action recommendation module 107 receives a new problem ticket 124. The action recommendation module 107 identifies the node associated with the new problem ticket 124 and obtains the system descriptors associated therewith. The action recommendation module 107 then creates a new node-ticket record 126 for the new problem ticket 124 similar to that discussed above. The query module 118 utilizes the new node-ticket record 126 as a query on the set of node-ticket clusters 120 (e.g., the cluster space). For example, the query module 118 compares the new node-ticket record 126 to the information within the set of action (node-ticket) clusters 120.

The query module 118 performs one or more cluster analysis operations to identify a given number of clusters that correspond to the new node-ticket record 126 within a given threshold (e.g., a similarity or correlation threshold). For example, the ranking module 122 computes a distance (e.g., correlation or similarity) of the node-ticket record of the new problem ticket 124 to each cluster in the set of action clusters 120. In one embodiment, the query module 118 can identify the problem associated with the new node-ticket record 126 and selects clusters in the set of action clusters 120 with a similar problem to perform the cluster analysis operations on. In this embodiment, the distance between the new node-ticket record 126 and the selected clusters is based on the system descriptors of the new node-ticket record 126 and the node-ticket records in the selected clusters. However, it should be noted that other embodiments are applicable as well. For example, the distance can be based on both the problem descriptor(s) and system descriptor(s) of the new node-ticket record 126 and node-ticket records in the set of action clusters 120.

Based on the cluster analysis operations performed on the set of action clusters 120 and the node-ticket record 126, the ranking module 122 ranks one or more of the node-ticket clusters. In one embodiment, the action clusters in the set of the action clusters 120 are ranked in order of increasing distance to the node-ticket record of the new problem ticket 124. However, other ranking mechanisms are applicable as well. The ranking module 122 selects a given number of clusters, such as the top-ranked N clusters, based on the ranking assigned thereto. The ranking module 122 then extracts/selects at least one of the set of problem diagnoses and the set of remedial actions from the node-ticket records 117 in the selected clusters.

The extracted/selected set of problem diagnoses and/or set of remedial actions are then ranked by the ranking module 122. In one embodiment, the problem diagnoses and/or remedial actions are ranked based on the distance between the new node-ticket record and the cluster from which the problem diagnoses and/or remedial actions were extracted/selected. In another embodiment, the problem diagnoses and/or remedial actions can also be ranked based on the frequency of the extracted/selected diagnoses and/or actions within their respective clusters. It should be noted that these rankings can be weighted rankings where the weights can be based on the correlation between attributes of the new node-ticket record and some pre-defined attributes of system and problem ticket descriptors. In one embodiment, the extracted/selected problem diagnoses and/or remedial actions can be ranked according to their relevance and specificity (or generality) using the taxonomic labels associated with their cluster. For example, a diagnosis/action with a higher degree of specificity as indicated by its taxonomic label can be ranked higher than a diagnosis/action with a lower degree of specificity. In this embodiment, a taxonomic label is also created for the new node-ticket record. It should be noted that, in one embodiment, problem descriptors can be weighted higher than system descriptors, and vice-versa. Therefore, a cluster with a matching or corresponding problem descriptor can be assigned a higher rank than a cluster with a matching or corresponding system descriptor (and vice-versa) when compared to the new node-ticket record.

Figure 8:
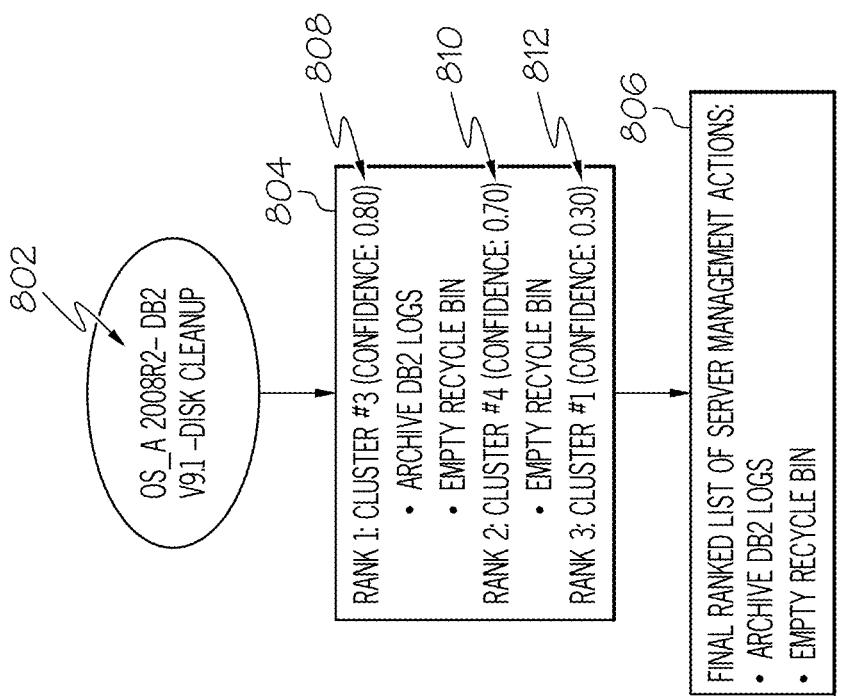
FIG. 8 shows one example of server management action rankings for a given node-ticket descriptor associated with a given taxonomic label according to one embodiment of a present invention.

FIG. 8 shows a taxonomic label 802 created for a new node-ticket record and rankings of server management actions. In this example, the new node-ticket record comprises a problem descriptor of "Disk Cleanup" and system descriptors of "OS A 2008R2" and "DB2 V9.1". Therefore, the action recommendation module 107 has generated the taxonomic label 802 of "OS A 2008R2—DB2 V9.1—Disk Cleanup". In one embodiment, the ranking module 122 can use the taxonomic label 802, individual system descriptors, and/or individual problem descriptors associated with the new node-ticket record to identify the top N corresponding node-ticket clusters. In this example, the top N corresponding node-ticket clusters from the clusters shown in FIG. 7 are the first cluster 702, the third cluster 706, and the fourth cluster 708.

Using the taxonomic label 710, 714, 716 of these three clusters and the taxonomic label 802 created for the new node-ticket record the ranking module 122 ranks the actions associated with each of these top N clusters as shown in FIG. 8. For example, FIG. 8 shows a list 804 of ranked actions indicating that the third cluster 706 has the highest ranking set of actions 722, the fourth cluster 708 has the second highest ranking set of actions 724, and the first cluster 702 has the lowest ranked set of actions 718. Once the ranking module 122 identifies and ranks the clusters, the various server management actions of these clusters can be merged and ranked in the order of the parent clusters. If the same action is found in multiple clusters, it is merged into one action in the final list. If an action is found in one or few clusters with low confidence values (as discussed below), then the action gets eliminated from the final list. The action recommendation module 107 can then send the entire list 804 of rank actions, a list 806 comprising only the highest ranking actions, etc. to the administrator system 108 for presentation to a user. The list(s) 804, 806 presented to a user can include the ranking associated with each set of actions in the list 804, 806.

It should be noted that, in one embodiment, the ranking module 122 also assigns a confidence value to the rankings. A confidence value is a function of the distance between the new node-ticket record attributes and the attributes of the clusters. The shorter the distance, which indicates a high correlation, the higher the confidence values. Confidence values can also be computed as a function of similarity between the taxonomic label of the new node-ticket record and all existing taxonomic labels of the various clusters. Other values such as applicability ratings, compatibility ratings, etc. can also be assigned to actions as well and presented to a user. For example, FIG. 8 shows that the first ranking 808 is associated with an 80% confidence value, the second ranking 810 is associated with a 70% value, and the third ranking 812 is associated with a 30% value.

Identifying Automation Solutions

Figure 9:
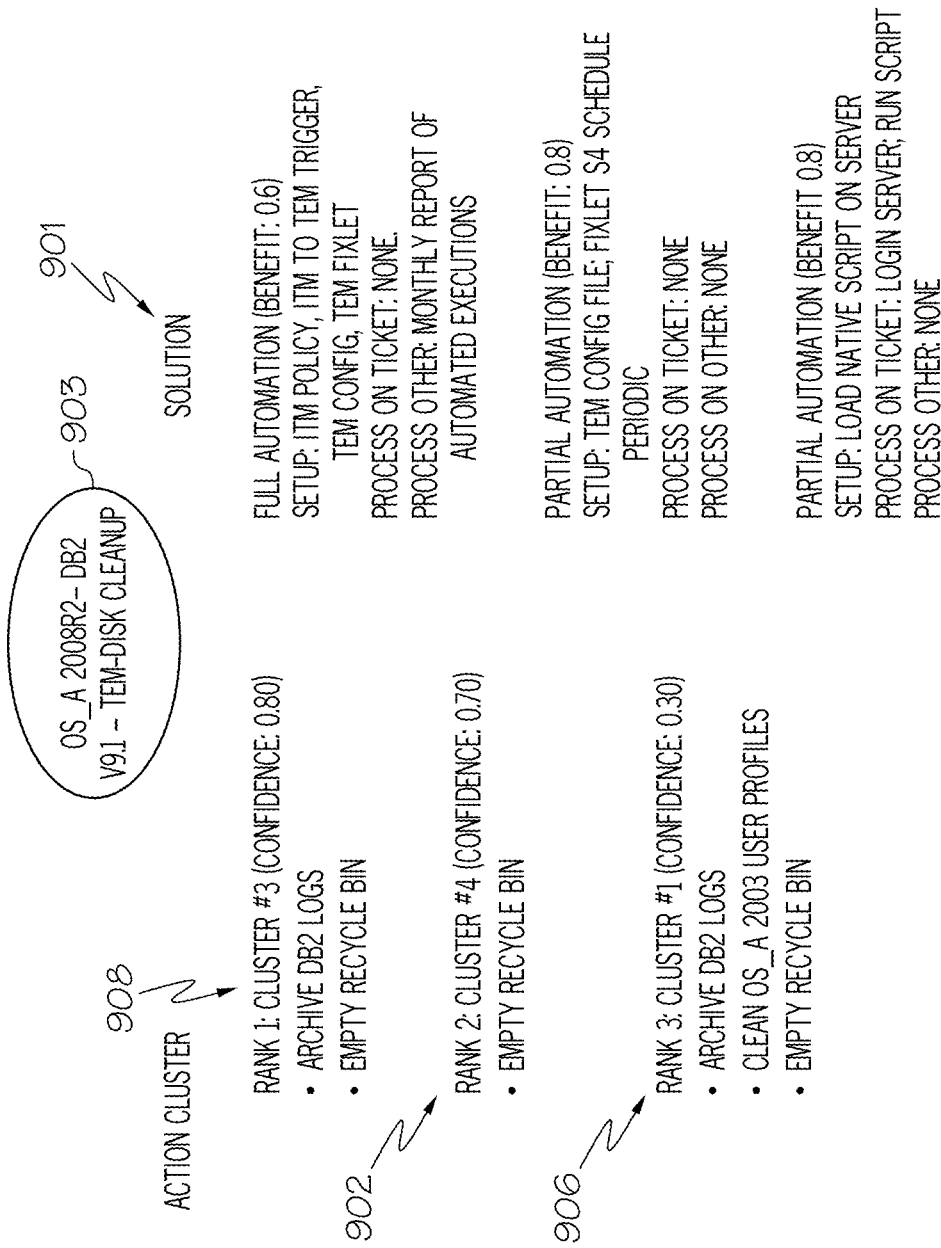
FIG. 9 shows one example of action and automation solution ranking according to one example of the present invention.

As discussed above, not only does the server action management system 106 recommend server management actions, but also provides relevant automation solutions comprised of (but not limited to) service management actions, setup procedures, and processes. In one embodiment, the recommendation module 107 identifies, for each list of action clusters created by the server action management system 106, the automation solutions that can be used for implementation, as shown in FIG. 9. In one embodiment, the search for related solutions is performed only for the action clusters ranked above a confidence threshold. An implementation solution is determined by matching a solution server description, tool requirements, and actions with those of the action cluster. If one solution cannot be found to cover all actions, a package of solutions is created with solutions that all match the server description and tool requirements, and combined cover all the actions in the action cluster. None, one, or more solutions can be identified for an action cluster.

In one embodiment, automation solutions can be assigned a benefit value. In this embodiment, the benefit value assigned to full solutions is higher compared to partial solutions. Similarly, the benefit value assigned to individual solutions is higher than the value assigned to packaged solutions. However, in other embodiments, the benefit value assigned to full solutions and individual solutions can be lower than the value assigned to partial solutions and packaged solutions, respectively. Matching of solutions to action items can be partial, with only some of the service management tools required by the solution being available or only some of the actions being matched. The assigned benefit value of partial-matching solutions is smaller than the benefit of fully matching solutions. However, in other embodiments, the benefit value assigned to partial-matching solutions can be higher than fully matching solutions. The benefit of a solution is combined with the confidence of the solution to produce a final ranking for the list of pairs of action clusters and solutions. A composite value can be created (e.g., taking the sum of the two) or a pair-wise model can be used, (e.g., ranking first by confidence and then by benefit).

FIG. 9 illustrates a solution list 903 for a node-ticket input 901 related to system features "OS A 2008R2" and "software db2 v9.1"; server management tools "TEM"; and action "disk cleanup". The benefit of the third cluster 906 (Rank 1) is smaller because the node currently does not have ITM installed. The benefit of the fourth cluster 902 (Rank 2) is diminished because the solution is partial-automatic. The benefit of the first cluster 908 (Rank 3) is diminished because it is partially automatic. The average of confidence vs. benefit is the same for the first two ranked clusters. The system administrator can select the second ranked cluster (the fourth cluster 902) for immediate implementation, and the first ranked cluster (third cluster 906) for near-term implementation conditioned by installation of ITM service management tool.

Operational Flow Diagrams

Figure 10:
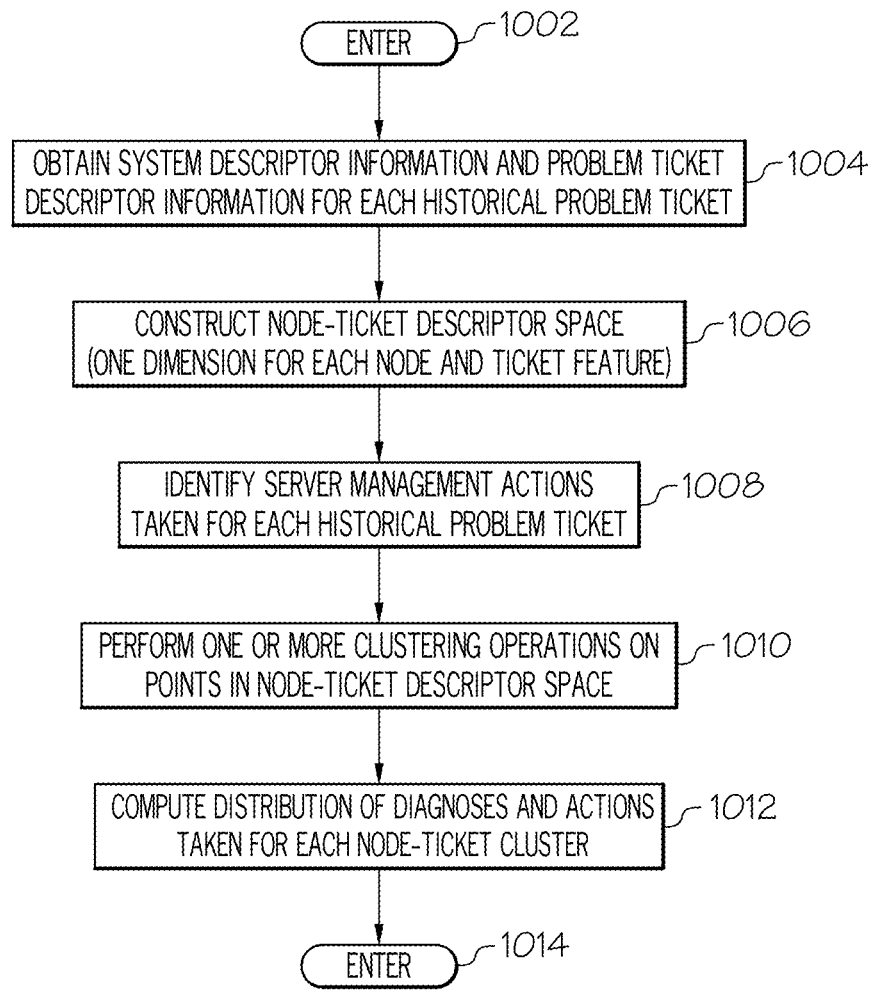
FIG. 10 is an operational flow diagram illustrating one example of a learning phase for identifying server management actions for resolving problems associated with one or more information processing nodes according to one embodiment of the present invention.

FIG. 10 is an operational flow diagram illustrating one example of a learning phase for identifying server management actions for resolving problems associated with one or more nodes in information technology infrastructure. The operational flow of FIG. 10 starts at step 1002 and flows directly into step 1004. The action recommendation module 107, at step 1004, obtains system descriptor information 115 and problem ticket descriptor information 114 for each historical problem ticket. The action recommendation module 107, at step 1006, constructs a node-ticket descriptor space with one dimension for each node and ticket feature.

The action recommendation module 107, at step 1008, identifies the server management actions taken for each of the historical problem tickets. The action recommendation module 107, at step 1010, performs one or more clustering operations on points in the node-ticket descriptor space. The action recommendation module 107, at step 1012, computes the distribution of diagnoses and actions taken for each node-ticket cluster that has been generated from performing the one or more clustering operations. The control flow then exits at step 1014.

Figure 11:
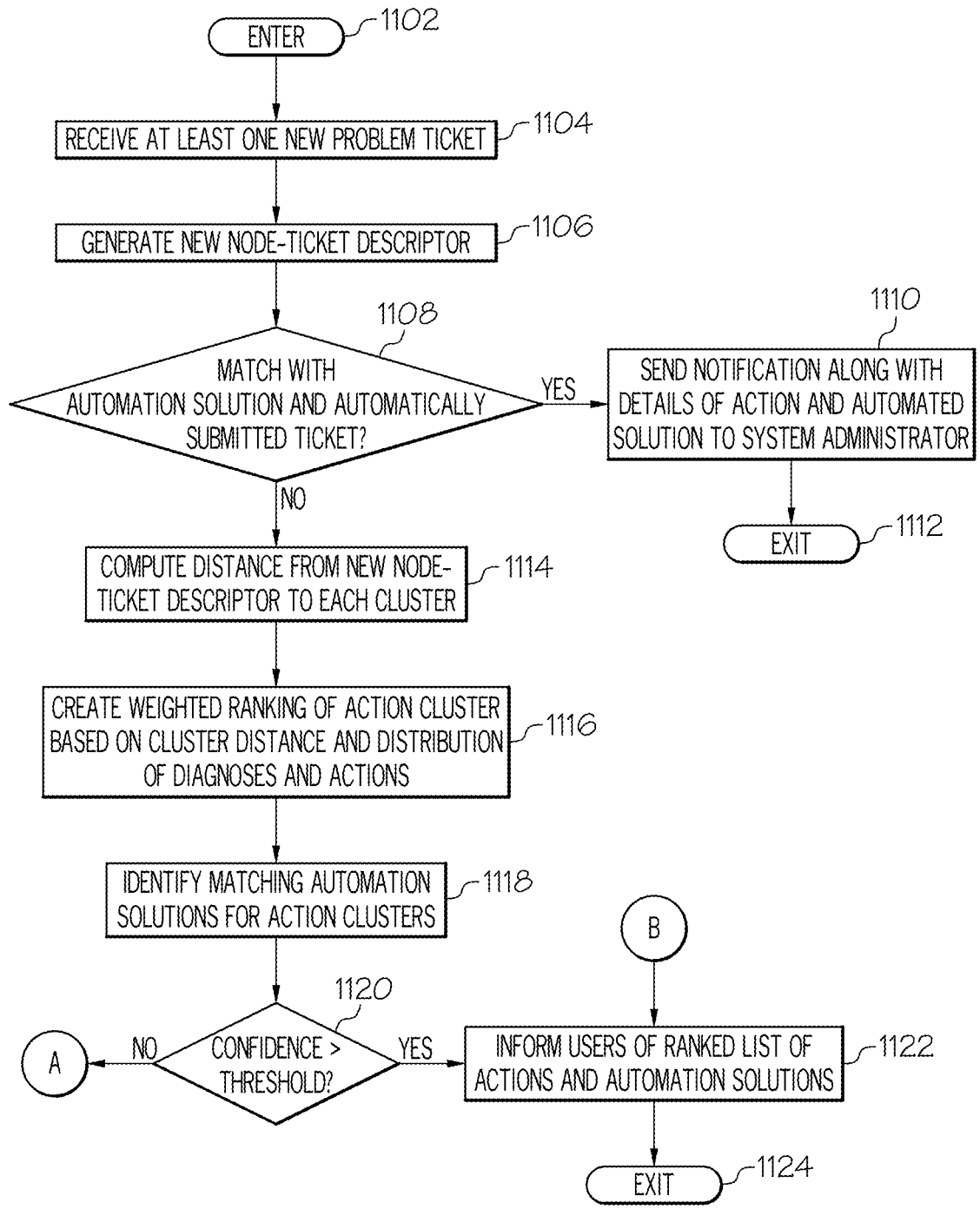
FIGS. 11 and 12 are operational flow diagrams illustrating one example of a production phase for identifying server management actions for resolving problems associated with one or more information processing nodes according to one embodiment of the present invention.

FIG. 11 is an operational flow diagram illustrating one example of a production phase for identifying server management actions for resolving problems associated with one or more nodes in information technology infrastructure. The operational flow of FIG. 11 starts at step 1102 and flows directly into step 1104. The action recommendation module 107, at step 1104, receives at least one new problem ticket 124 identifying one or more operational problems at one or more information processing nodes 102. The action recommendation module 107, at step 1106, generates a new node-ticket descriptor for the new problem ticket 124.

The action recommendation module 107, at step 1108, determines if the node-ticket descriptor matches any active automation solution on the specific node. If the result of this determination is positive the action recommendation module 107, at step 1110, sends a notification to the admin system 108. The notification may include details about the action to be taken by the admin system 108 or human operator upon receipt. In a sample embodiment, the notification includes details on what actions should be performed, according to the solution descriptor, Process On Ticket 516, if a specific action is indicated. If no action is indicated, the receipt of a ticket is considered an anomaly from expected automation process, and the notification sent by action recommendation module 107 will indicate this. This notification includes the details of the action to be taken to correct the problem and details of the automated solution to be implemented at the system experiencing the problem. The control flow then exits at step 1112.

If the result of the determination made at step 1108 is negative, the action recommendation module 107, at step 1114, computes the distance from the new node-ticket descriptor to each node-ticket cluster 120. The action recommendation module 107, at step 1110, creates a weighted ranking of system management diagnoses and actions based on cluster distance and distribution of diagnoses and actions. The action recommendation module 107, at step creates a weighted ranking of actions clusters based on cluster distance and distribution of diagnoses and actions. The action recommendation module 107, at step 1118, identifies matching automation solutions for the ranked action clusters. The action recommendation module 107, at step 1120, determines if a confidence associated with each ranked action cluster is above a given threshold that would enable the action recommendation action to implement the solution automatically and resolve the problem. [If this determination is negative, the action recommendation module 107 cannot take any problem resolution action and, at step 1122, informs the admin system 108 of the ranked list of actions and automation solutions associated with the ranked action clusters having a matching confidence above the threshold. The control flow then exits at step 1124. The system administrator is expected to analyze the solutions and decide on how to resolve the problem.

Figure 12:
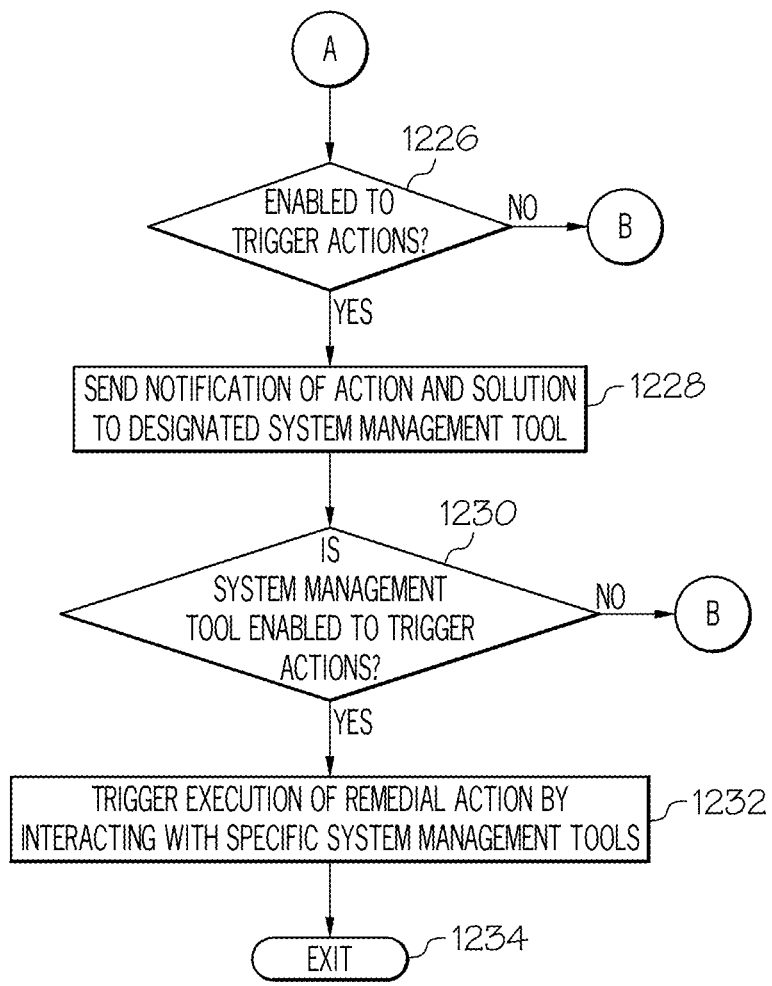

If the determination made at step 1120 is positive, the action recommendation module 107 can initiate the automated resolution of the problem. The control flows to entry point A of FIG. 12. The action recommendation module 107, at step 1226, determines if it is enabled to trigger actions and all the prerequisites for execution of the actions are satisfied (such as, completely match of system characteristics). If the result of this determination is negative the control flows to entry point B of FIG. 11, where the action recommendation module 107 provides the admin system 108 of all of the solution candidates. If the result of this determination is positive, the action recommendation module 107 initiates the execution of a solution. The action recommendation module 107, at step 1228, it sends a notification of the action and solution to the designated management tool.

The action recommendation module 107, at step 1230, determines if the system management tool is enabled to trigger an action. If the result of this determination is negative the control flows to entry point B of FIG. 11. If the result of this determination is positive, the action recommendation module 107, at step 1232, triggers execution of a remedial action(s) by interacting with specific system management tools. The action recommendation module 107, at step 1234, sends a notification to the admin system 108 that an automated action was triggered for the input node-ticket descriptor. The control flow then exits at step 1236.

Figure 13:
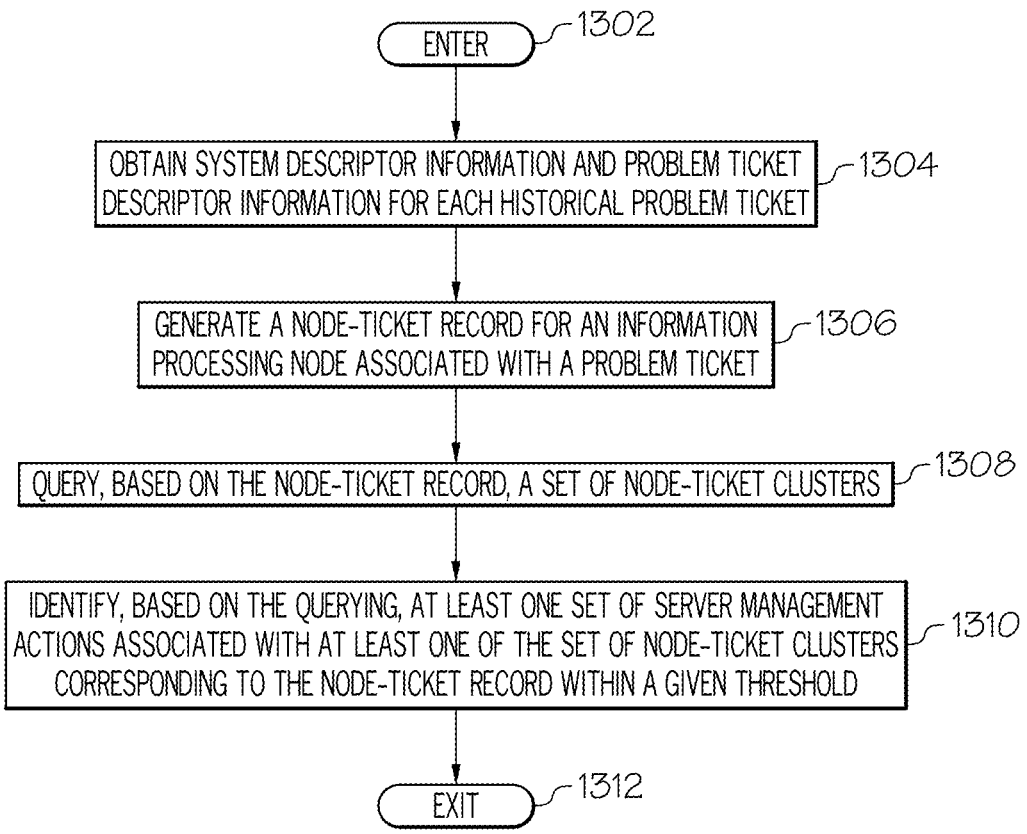
FIG. 13 is an operational flow diagram illustrating one example of process for identifying server management actions for resolving problems associated with one or more information processing nodes according to one embodiment of the present invention.

FIG. 13 is an operational flow diagram illustrating one example for identifying server management actions for resolving problems associated with one or more nodes in information technology infrastructure. The operational flow of FIG. 13 starts at step 1302 and flows directly into step 1304. The action recommendation module 107, at step 1304, obtains system descriptor information 114 and problem ticket descriptor information 112 for each historical problem ticket. The action recommendation module 107, at step 1306, generates a node-ticket record 126 for an information processing node 102 associated with a problem ticket 124. The node-ticket record 126 comprises a set of system descriptors and a set of problem descriptors. Each of the set of system descriptors describes at least one attribute of the information processing node 102. Each of the set of problem descriptors describes at least one operational problem occurring at the information processing node 102.

The action recommendation module 107, at step 1308, queries, based on the node-ticket record 126, a set of node-ticket clusters 120. Each of the set of node-ticket clusters 120 maps a set of server management actions 115 to set of historical node-ticket records 117 associated with the node-ticket cluster 120. Each of the set of historical node-ticket records 120 comprises at least one common system descriptor and at least one common problem descriptor. The set of server management actions 115 were previously performed to resolve at least one operational problem associated with at least one information processing node. The action recommendation module 107, at step 1310, identifies, based on the querying, at least one set of server management actions 115 associated with at least one of the set of node-ticket clusters 120 corresponding to the node-ticket record within a given threshold. The control flow exits at step 1312.

Information Processing System

Figure 14:
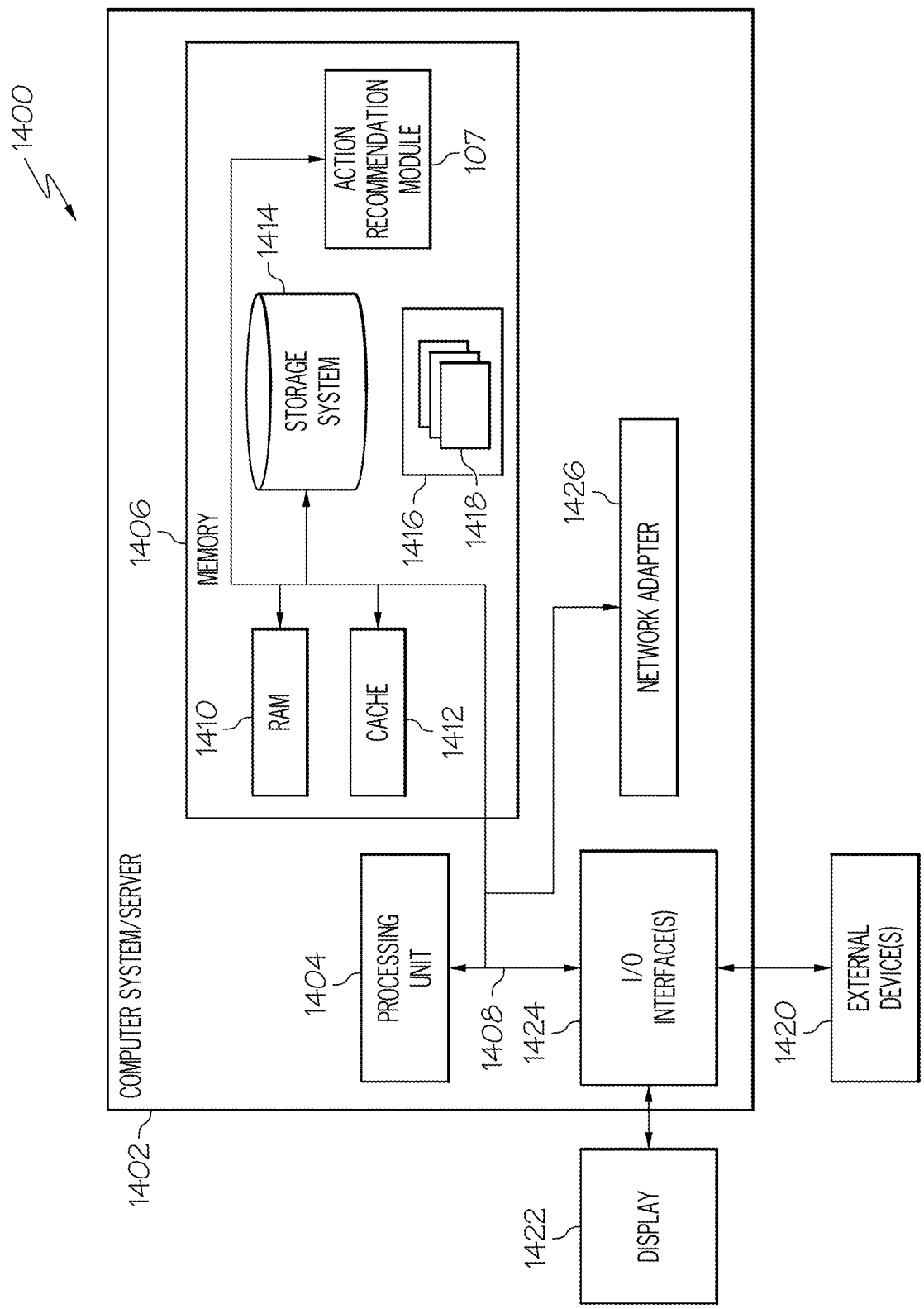
FIG. 14 is a block diagram illustrating a detailed view of an information processing system according to one embodiment of the present invention.

FIG. 14 illustrates an information processing system 1402 that can be utilized in various embodiments of the present invention. The information processing system 1402 shown in FIG. 14 is only one example of a suitable system and is not intended to limit the scope of use or functionality of embodiments of the present invention described above. The information processing system 1402 of FIG. 14 is capable of implementing and/or performing any of the functionality set forth above. Any suitably configured processing system can be used as the information processing system 1402 in embodiments of the present invention.

As illustrated in FIG. 14, the information processing system 1402 is in the form of a general-purpose computing device. The components of the information processing system 1402 can include, but are not limited to, one or more processors or processing units 1404, a system memory 1406, and a bus 1408 that couples various system components including the system memory 1406 to the processor 1404.

The bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1406, in one embodiment, comprises the action recommendation module 107 and its components discussed above. The system memory 1406 can also comprise one or more of the databases 114 discussed above as well. Even though FIG. 14 shows the action recommendation module 107 residing in the main memory, the action recommendation module 107 can reside within the processor 1404, be a separate hardware component, and/or be distributed across a plurality of information processing systems and/or processors.

The system memory 1406 can also include computer system readable media in the form of volatile memory, such as random access memory (RAM) 1410 and/or cache memory 1412. The information processing system 1402 can further include other removable/non-removable, volatile/non-volatile computer system storage media. By way of example only, a storage system 1414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1408 by one or more data media interfaces. The memory 1406 can include at least one program product having a set of program modules that are configured to carry out the functions of an embodiment of the present invention.

Program/utility 1416, having a set of program modules 1418, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of embodiments of the present invention.

The information processing system 1402 can also communicate with one or more external devices 1420 such as a keyboard, a pointing device, a display 1422, etc.; one or more devices that enable a user to interact with the information processing system 1402; and/or any devices (e.g., network card, modem, etc.) that enable computer system/server 1402 to communicate with one or more other computing devices. Such communication can occur via I/O interfaces 1424. Still yet, the information processing system 1402 can communicate with one or more networks such as a local area network (LAN), a general wide area network (WAN), and/or a public network (e.g., the Internet) via network adapter 1426. As depicted, the network adapter 1426 communicates with the other components of information processing system 1402 via the bus 1408. Other hardware and/or software components can also be used in conjunction with the information processing system 1402. Examples include, but are not limited to: microcode, device drivers, redundant processing units, external disk drive arrays, RAID systems, tape drives, and data archival storage systems.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method, with an information processing system, for automatically configuring one or more nodes in an information technology infrastructure with server management actions for automatically resolving problems associated with the one or more nodes, the method comprising:

generating, by a processing circuit of the at least one information processing system, a node-ticket record for an information processing node associated with an unresolved problem ticket identifying at least one unresolved problem with the information processing node, wherein the node-ticket record is separate and distinct from the unresolved problem ticket associated with the information processing node and only contains a set of system descriptors and a set of problem descriptors, wherein each of the set of system descriptors describes at least one attribute of the information processing node, and wherein each of the set of problem descriptors describes at least one operational problem occurring at the information processing node;

querying, by the processing circuit utilizing the node-ticket record, a set of node-ticket clusters, wherein each of the set of node-ticket clusters is comprised of a plurality of historical node-ticket records each assigned to a given node-ticket cluster based on at least one common system descriptor and at least one common problem descriptor comprised within each of the plurality of historical node-ticket records, each of the set of node-ticket clusters further comprising a set of server management actions mapped to each of the plurality of historical node-ticket records, wherein the set of server management actions were previously performed to resolve at least one previous operational problem associated with at least one information processing node;

identifying, by the processing circuit based on the querying, at least one set of server management actions associated with at least one of the set of node-ticket clusters corresponding to the node-ticket record within a given threshold; and automatically resolving, by the processing circuit, the unresolved problem at the information processing node utilizing the at least one set of server management actions, wherein automatically resolving the unresolved problem comprises
automatically configuring, by the processing circuit, one or more system management tools residing at the information processing node to perform the at least one set of server management actions.

2. The method of claim 1, further comprising:
presenting the at least one set of server management actions that has been identified to a user.

3. The method of claim 1, wherein each of the set of node-ticket clusters is associated with a taxonomic label generated based on the at least one common system descriptor and the at least one common problem descriptor associated with the node-ticket cluster.

4. The method of claim 1, wherein the identifying comprises:
identifying, based on the querying, a top N number of node-ticket clusters corresponding to the node-ticket record, wherein the at least one set of server management actions that has been identified is associated with at least one of the top N number of node-ticket clusters.

5. The method of claim 4, wherein identifying the top N number of node-ticket clusters comprises:
determining a clustering distance between each of the set of node-ticket clusters and the node-ticket record; and
selecting a subset of node-ticket clusters from the set of node-ticket clusters comprising N shortest clustering distances as the top N node-ticket clusters.

6. The method of claim 5, wherein identifying the at least one set of server management actions further comprises:
assigning a rank to each set of server management actions associated with each of the top N node-ticket clusters; and
selecting the at least one set of server management actions from the each set of server management actions associated with each of the top N node-ticket clusters based on the rank assigned thereto.

7. The method of claim 6, further comprising:
presenting the at least one set of server management actions to a user with the rank assigned to the at least one set of server management actions that has been selected.

8. The method of claim 6, wherein each of the top N node-ticket clusters is associated with a taxonomic label generated based on the at least one common system descriptor and the at least one common problem descriptor associated with each of the top N clusters, and
wherein the rank is assigned to the each set of server management actions associated with each of the top N node-ticket clusters based on the taxonomic label of each of the top N node-ticket clusters.

9. The method of claim 8, wherein the rank is assigned based on one of a level of generality and a level of specificity of the taxonomic label.

10. A method, with an information processing system, for automatically configuring one or more nodes in an information technology infrastructure with automation solutions for automatically resolving problems associated with the one or more nodes in the information technology infrastructure, the method comprising:
generating, by a processing circuit of the at least one information processing system, a node-ticket record for an information processing node associated with at least one unresolved problem ticket identifying at least one unresolved problem with the information processing node, wherein the node-ticket record is separate and distinct from the unresolved problem ticket associated with the information processing node and only contains a set of problem descriptors and a set of system descriptors, wherein each of the set of problem descriptors describes at least one operational problem occurring at the information processing node, and wherein each of the set of system descriptors describes at least one attribute of the information processing node;
querying, by the processing circuit utilizing the node-ticket record, a set of node-ticket clusters, wherein each of the set of node-ticket clusters is comprised of a plurality of historical node-ticket records each assigned to a given node-ticket cluster based on at least one common system descriptor and at least one common problem descriptor comprised within each of the plurality of historical node-ticket records, each of the set of node-ticket clusters further comprising a set of server management actions and a set of automation solutions mapped to each of the plurality of historical node-ticket records, wherein each of the set of automation solutions configures one or more information processing nodes to automatically perform one or more of the set of server management actions for resolving at least one operational problem associated with the one or more information processing nodes, and wherein each of the set of automation solutions is associated with a set of service management actions and comprises a set of information technology service management processes required for repeatedly executing the automation solution;
identifying, by the processing circuit based on the querying, at least one set of server management actions and at least one automated solution associated with at least one of the set of node-ticket clusters corresponding to the node-ticket record within a given threshold; and
automatically resolving, by the processing circuit, the unresolved problem at the information processing node utilizing the at least one set of server management actions and the at least one automated solution, wherein automatically resolving the unresolved problem comprises
automatically configuring, by the processing circuit, one or more system management tools residing at the information processing node to perform the at least one automation solution, wherein the at least one automation solution automatically performs the at least one set of server management actions.

11. The method of claim 10, wherein the node-ticket record further comprises a set of service management descriptors, and wherein each of the set of service management descriptors describes at least one attribute of at least one set of service management tools and processes associated with the information processing node, and
wherein each of the set of historical node-ticket records further comprises at least one common service management descriptor.

12. The method of claim 11, wherein the at least one set of server management actions and the at least one automated solution are identified based on the set of problem descriptors, the set of system descriptors, and the set of service management descriptors of the information processing node corresponding to the at least one common problem descriptor, the at least one common system descriptor, and the at least one common service management descriptor of the set of historical node-ticket records associated with the at least one of the set of node-ticket clusters within the given threshold.

13. The method of claim 10, wherein each of the set of automation solutions is associated with at least one of:
a set of system descriptors;
a set of service management tools;
a set of setup instructions;
a set of service management actions; and
a set of service management processes.

14. A computer program product for automatically configuring one or more nodes in an information technology infrastructure with server management actions for automatically resolving problems associated with the one or more nodes, the computer program product comprising:
a non-transitory storage medium readable by a processing circuit and storing instructions for execution by the processing circuit for performing a method comprising:
generating, by the processing circuit, a node-ticket record for an information processing node associated with an unresolved problem ticket identifying at least one unresolved problem with the information processing node, wherein the node-ticket record is separate and distinct from the unresolved problem ticket associated with the information processing node and only contains a set of system descriptors and a set of problem descriptors, wherein each of the set of system descriptors describes at least one attribute of the information processing node, and wherein each of the set of problem descriptors describes at least one operational problem occurring at the information processing node;

querying, by the processing circuit utilizing the node-ticket record, a set of node-ticket clusters, wherein each of the set of node-ticket clusters is comprised of a plurality of historical node-ticket records each assigned to a given node-ticket cluster based on at least one common system descriptor and at least one common problem descriptor comprised within each of the plurality of historical node-ticket records, each of the set of node-ticket clusters further comprising a set of server management actions mapped to each of the plurality of historical node-ticket records, wherein the set of server management actions were performed previously to resolve at least one previous operational problem associated with at least one information processing node;

identifying, by the processing circuit based on the querying, at least one set of server management actions associated with at least one of the set of node-ticket clusters corresponding to the node-ticket record within a given threshold; and automatically resolving, by the processing circuit, the unresolved problem at the information processing node utilizing the at least one set of server management actions, wherein automatically resolving the unresolved problem comprises automatically configuring, by the processing circuit, one or more system management tools residing at the information processing node to perform the at least one set of server management actions.

15. The computer program product of claim 14, wherein the identifying comprises:
identifying, based on the querying, a top N number of node-ticket clusters corresponding to the node-ticket record, wherein the at least one set of server management actions that has been identified is associated with at least one of the top N number of node-ticket clusters.

16. The computer program product of claim 15, wherein identifying the top N number of node-ticket clusters comprises:
determining a clustering distance between each of the set of node-ticket clusters and the node-ticket record; and
selecting a subset of node-ticket clusters from the set of node-ticket clusters comprising N shortest clustering distances as the top N node-ticket clusters.

17. The computer program product of claim 16, wherein identifying the at least one set of server management actions further comprises:
assigning a rank to each set of server management actions associated with each of the top N node-ticket clusters;
selecting the at least one set of server management actions from the each set of server management actions associated with each of the top N node-ticket clusters based on the rank assigned thereto; and
presenting the at least one set of server management actions to a user with the rank assigned to the at least one set of server management actions that has been selected.

18. An information processing system for automatically configuring one or more nodes in an information technology infrastructure with server management actions for automatically resolving problems associated with the one or more nodes, the information processing system comprising:
a memory;
a processor communicatively coupled to the memory; and
an action recommendation module communicatively coupled to the memory and the processor, wherein the action recommendation module is configured to perform a method comprising:
generating a node-ticket record for an information processing node associated with an unresolved problem ticket identifying at least one unresolved problem with the information processing node, wherein the node-ticket record is separate and distinct from the unresolved problem ticket associated with the information processing node and only contains a set of system descriptors and a set of problem descriptors, wherein each of the set of system descriptors describes at least one attribute of the information processing node, and wherein each of the set of problem descriptors describes at least one operational problem occurring at the information processing node;
querying, utilizing the node-ticket record, a set of node-ticket clusters, wherein each of the set of node-ticket clusters is comprised of a plurality of historical node-ticket records each assigned to a given node-ticket cluster based on at least one common system descriptor and at least one common problem descriptor comprised within each of the plurality of historical node-ticket records, each of the set of node-ticket clusters further comprising a set of server management actions mapped to each of the plurality of historical node-ticket records, wherein the set of server management actions were previously performed to resolve at least one previous operational problem associated with at least one information processing node; and
identifying, based on the querying, at least one set of server management actions associated with at least one of the set of node-ticket clusters corresponding to the node-ticket record within a given threshold; and
automatically resolving the unresolved problem at the information processing node utilizing the at least one set of server management actions, wherein automatically resolving the unresolved problem comprises
automatically configuring one or more system management tools residing at the information processing node to perform the at least one set of server management actions.

19. The information processing system of claim 18, wherein the identifying comprises:
identifying, based on the querying, a top N number of node-ticket clusters corresponding to the node-ticket record, wherein the at least one set of server management actions that has been identified is associated with at least one of the top N number of node-ticket clusters, and
wherein identifying the top N number of node-ticket clusters comprises:
determining a clustering distance between each of the set of node-ticket clusters and the node-ticket record; and selecting a subset of node-ticket clusters from the set of node-ticket clusters comprising N shortest clustering distances as the top N node-ticket clusters.

* * * * *